United States Patent
Matsueda et al.

(10) Patent No.: US 6,354,499 B2
(45) Date of Patent: *Mar. 12, 2002

(54) CODE IMAGE READING APPARATUS (75) Inventors: Akira Matsueda, Hachioji; Takeshi Mori, Machida, both of (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,831

(22) Filed: Jun. 4, 1999

(30) Foreign Application Priority Data

Jun. 8, 1998 (JP) .......................... 10-159238

(51) Int. Cl.⁷ ................................ G06K 7/10
(52) U.S. Cl. ..................... 235/435; 382/181
(58) Field of Search ................. 235/435, 494, 235/436, 439; 360/1, 2; 382/181, 190; 371/37.1, 40.1

(56) References Cited

U.S. PATENT DOCUMENTS

| | | | | |
|---|---|---|---|---|
| 3,072,918 A | * | 1/1963 | Sasaki et al. ............. | 382/317 |
| 5,591,956 A | * | 1/1997 | Longrace, Jr. et al. ...... | 235/494 |
| 5,754,687 A | * | 5/1998 | Fujimori et al. ........... | 382/190 |
| 5,841,793 A | * | 11/1998 | Fukuda ................... | 371/37.01 |
| 5,866,895 A | | 2/1999 | Fukuda et al. | |
| 5,896,403 A | * | 4/1999 | Nagasiki et al. ........... | 714/37.1 |
| 5,898,709 A | * | 4/1999 | Imade et al. ............. | 371/40.11 |
| 5,920,661 A | * | 7/1999 | Mori et al. ................ | 382/317 |
| 6,144,324 A | * | 11/2000 | Sasaki ..................... | 341/94 |

FOREIGN PATENT DOCUMENTS

| | | | |
|---|---|---|---|
| EP | 0717398 A2 | | 6/1996 |
| JP | 02-105333 A | * | 4/1990 |
| JP | 05-109068 A | * | 4/1993 |
| JP | 09-282404 A | * | 10/1997 |
| JP | 10-063803 | * | 3/1998 |

* cited by examiner

Primary Examiner—Michael G. Lee
Assistant Examiner—Diane I. Lee
(74) Attorney, Agent, or Firm—Frishauf, Holtz, Goodman, Langer & Chick, P.C.

(57) ABSTRACT

Dot codes (i.e., code images) are printed on a paper sheet. Each dot code has a variable part and a fixed part. The variable part is specific to the dot code, whereas the fixed part is common to the dot codes. The fixed part represents an audio mark that informs a user when the user should move a dot code reader (i.e., a code image reading apparatus) to read the next dot code. As the user moves the dot code reader over any dot code, the reader reproduces an audio message from the variable part and then an audio mark from the fixed part. The user hears the audio message and the audio mark through an earphone. Upon hearing the audio mark indicating that the audio message has been completely reproduced, the user may move the reader to the next dot code.

19 Claims, 7 Drawing Sheets

| VARIABLE PART | FIXED PART | CONDITION TABLE | CODE-GROUP NUMBER | CODE ID LABEL |
|---|---|---|---|---|
| | | | | |

FIG. 14

| | | | | | |
|---|---|---|---|---|---|
| SUBSET CODE A | "this" | "P00" | A,B,C,D,A+...+D | 001 | A |
| SUBSET CODE B | "is" | "P00" | A,B,C,D,A+...+D | 001 | B |
| SUBSET CODE C | "a" | "P00" | A,B,C,D,A+...+D | 001 | C |
| SUBSET CODE D | "Pen" | "P00" | A,B,C,D,A+...+D | 001 | D |

FIG. 15

CODE IMAGE READING APPARATUS

BACKGROUND OF THE INVENTION

The present invention relates to an apparatus for optically reading code images printed on a recording media when manually operated and for outputting so-colled "multimedia information" represented by the code images, said multimedia information comprises audio data, video data and text data.

A code image reading apparatus is disclosed in the specification of U.S. Pat. No. 5,866,895. When manually operated, this apparatus optically scans a dot code (i.e., a code images) printed on a recording medium such as a paper sheet and outputs multimedia information which is represented by the code images and which include audio data, video data and text data.

Figure 1:
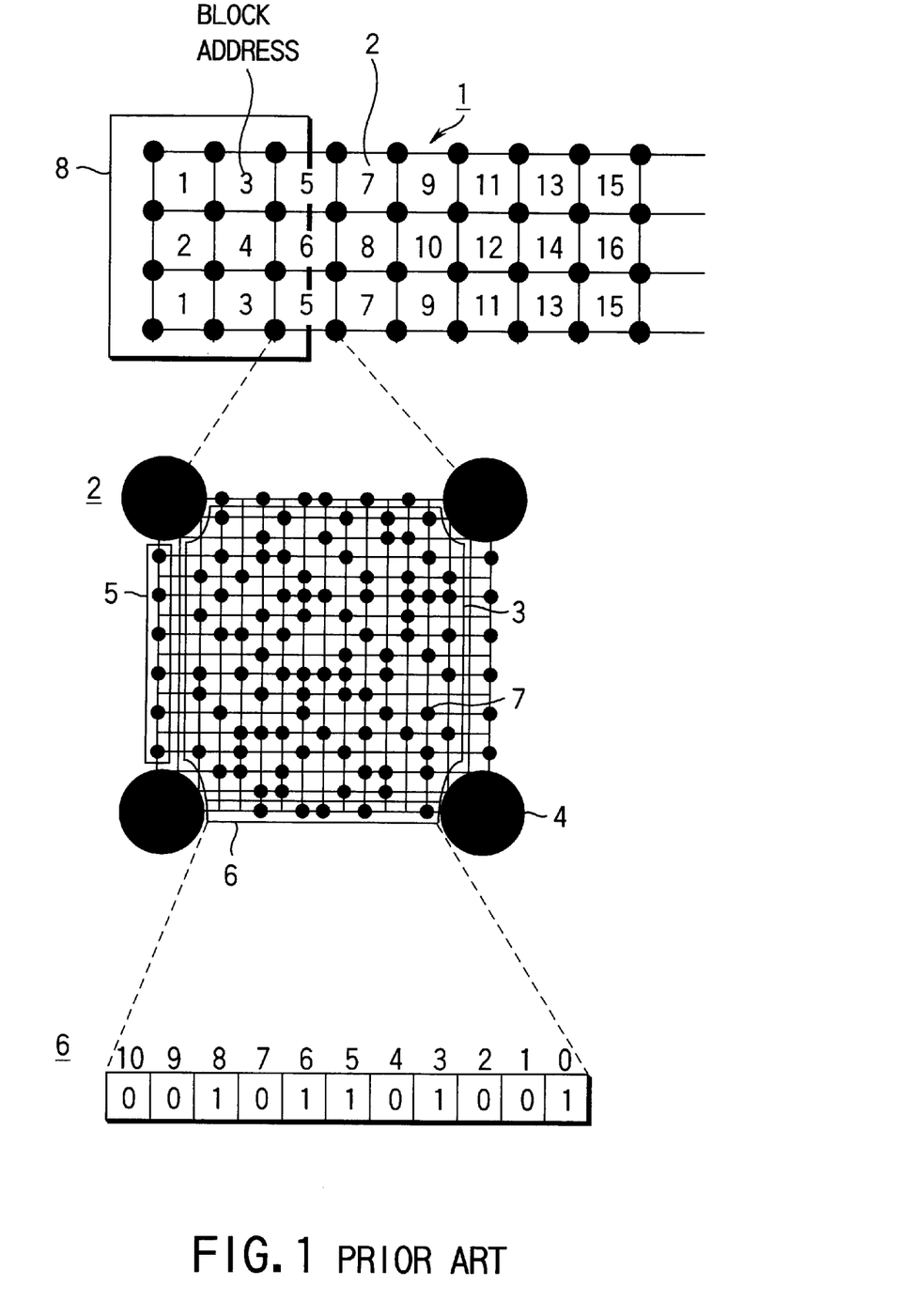
FIG. 1 is a diagram illustrating the physical format of a dot code, i.e., an example of a conventional code image.

FIG. 1 illustrates the physical format of the dot code 1 disclosed in U.S. Pat. No. 5,866,895.

As shown in FIG. 1, the dot code 1 is composed of a plurality of data blocks 2 which are arranged in rows and columns. Each data block 2 consists of a data-dot pattern section 3, a plurality of markers 4, a matching-dot pattern 5, and a block-address pattern 6. The data-dot pattern section 3 is a region in which white data dots 7 and black data dots 7 are printed in a predetermined arrangement. These data dots 7 constitute coded data for the block, representing audio data, video data and text data. Each white data dot 7 corresponds to a binary "0," and each black data dot 7 corresponds to a binary "1." The block 2 has markers 4 at the four corners of the data-dot pattern section 3. The markers 4, each made of a prescribed number of black dots, are used to define reference points in preparation for reading the data dots 7 printed in the data-dot pattern section 3. The matching-dot pattern 5 extends between two adjacent markers 4 and has matching dots printed in a particular pattern. The block-address pattern 6 extends between two adjacent markers 4, one of which is one of the two adjacent markers 4 between which the matching-dot pattern 5 extends. The block-address pattern 6 has block-address dots and error-detecting or -correcting dots.

A code image reader is used to scan the dot code 1 having the physical format shown in FIG. 1. The code image reader may have a view field 8 that is smaller than the dot code 1 as shown in FIG. 1 and may not scan the entire dot code 1 at one shot. Even in this case, any data block 2 read can be identified in accordance with the block-address dot pattern 6, which has been read, too. Hence, as many data blocks 2 as desired can be printed on a recording medium (e.g., a paper sheet), forming as large a dot code 1 as desired, and can be read to reproduce coded data they represent. On the recording medium, far more data can be printed than in the form of a conventional one- or two-dimensional bar code. This may facilitate data communication using paper sheets or the like as recording media. Further, the dot code 1 may find new various uses.

The code image reader is, however, disadvantageous in the following respect.

The code image reader is manually moved over a dot code when reading the dot code, and the reader outputs the multimedia information represented by the dot code it has read. However, if the dot code the user has just read by operating the code image reader represents an audio message with a silent period, upon detecting the silent period, the user may misunderstand that the entire message has been reproduced and may therefore move the reader over the next dot code. If this happens, the remaining part of the message cannot be reproduced at all.

This inconvenience may arise particularly if no notes are printed on the medium to specify the contents of the audio message, if such a note is printed but the user is visually handicapped, or if the silent period is a comparatively long one.

BRIEF SUMMARY OF THE INVENTION

The present invention has been made in view of the foregoing. The object of the invention is to provide a code image reading apparatus which optically reads an code image when manually operated, outputs multimedia information, such as audio data, represented by the code image, and informs a user that multimedia information has been completely output to facilitate the reading of a plurality of code images.

According to an aspect of the present invention, there is provided a code image reading apparatus comprising:

an imaging section for optically reading code images printed on a recording medium and converting the code images to image signals when the code image reading apparatus is manually operated, each of the code images being a coded data item containing a first data item which includes at least one of audio data, video data and text data;

a data-restoring section for processing each of the image signals output from the imaging section, thereby restoring the coded data item containing the first data item;

a first data output section for processing the coded data restored by the data-restoring section, thereby outputting the first data item; and a second data output section for processing prescribed ones of the code images, thereby outputting a second data item which is different from the first data item and which is common to the prescribed coded images, wherein the first and second output sections operate in association to output the first data item and the second data item, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Embodiments of the present invention will now be described, with reference to the accompanying drawings.

First Embodiment

Figure 2:
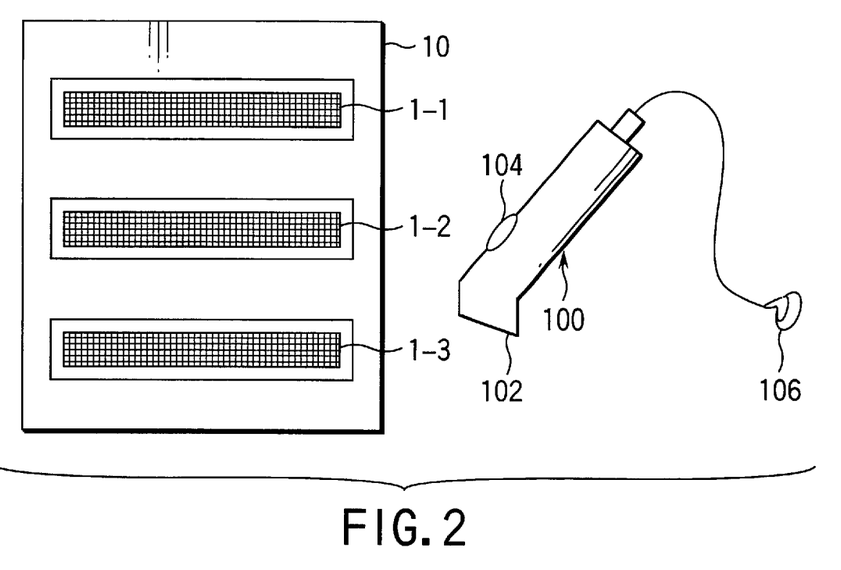
FIG. 2 is a diagram showing a template-type code sheet for use of visually handicapped persons and a dot code reader which is the first embodiment of a code image reading apparatus of the invention.

FIG. 2 shows a template-type code sheet 10 for use of visually handicapped persons and a dot code reader 100, i.e., the first embodiment of a code image reading apparatus of the invention.

The template-type code sheet 10 is relatively thick and three grooves cut in one surface. Three dot codes 1-1, 1-2 and 1-3 are printed on the bottoms of these grooves, respectively. The grooves are sufficiently large so that the distal end 102 of the dot code reader 100 may loosely fit in the grooves.

How the template-type code sheet 10 has been formed will be explained, with reference to FIG. 3. A paper sheet 16 is interposed between a base sheet 12 and a top sheet 14. The base sheet 12 is made of cardboard material, plastic or the like and about 2 to 3 mm thick. The top sheet 14 has three rectangular windows 18. Three dot codes 1-1, 1-2 and 1-3 are printed on the paper sheet 16 and seen through the rectangular windows 18.

The dot codes 1-1, 1-2 and 1-3 are of the type shown in FIG. 1. Namely, each dot code is composed of data blocks 2 arranged in rows and columns. Each data block 2 consists of a data-dot pattern section 3, markers 4, a matching-dot pattern 5, and a block-address pattern 6. The markers 4 are arranged at the four corners of the data-dot pattern section 3. The data recorded in the data-dot pattern section 3 is a combination of user data and an error-correcting code.

As shown in FIG. 2, the dot code reader 100 has a scan switch 104, and an earphone 106 is connected to the dot code reader 100. The dot code reader 100 can read any dot code printed on the code sheet 10 and reproduce data from the dot code when it is manually moved over the dot code. More specifically, a user holds and moves the reader 100, while continuously depressing the scan switch 104. Upon scanning the dot code completely, the user releases the scan switch, the earphone 106 generates the audio message reproduced from the dot code.

Figure 4:
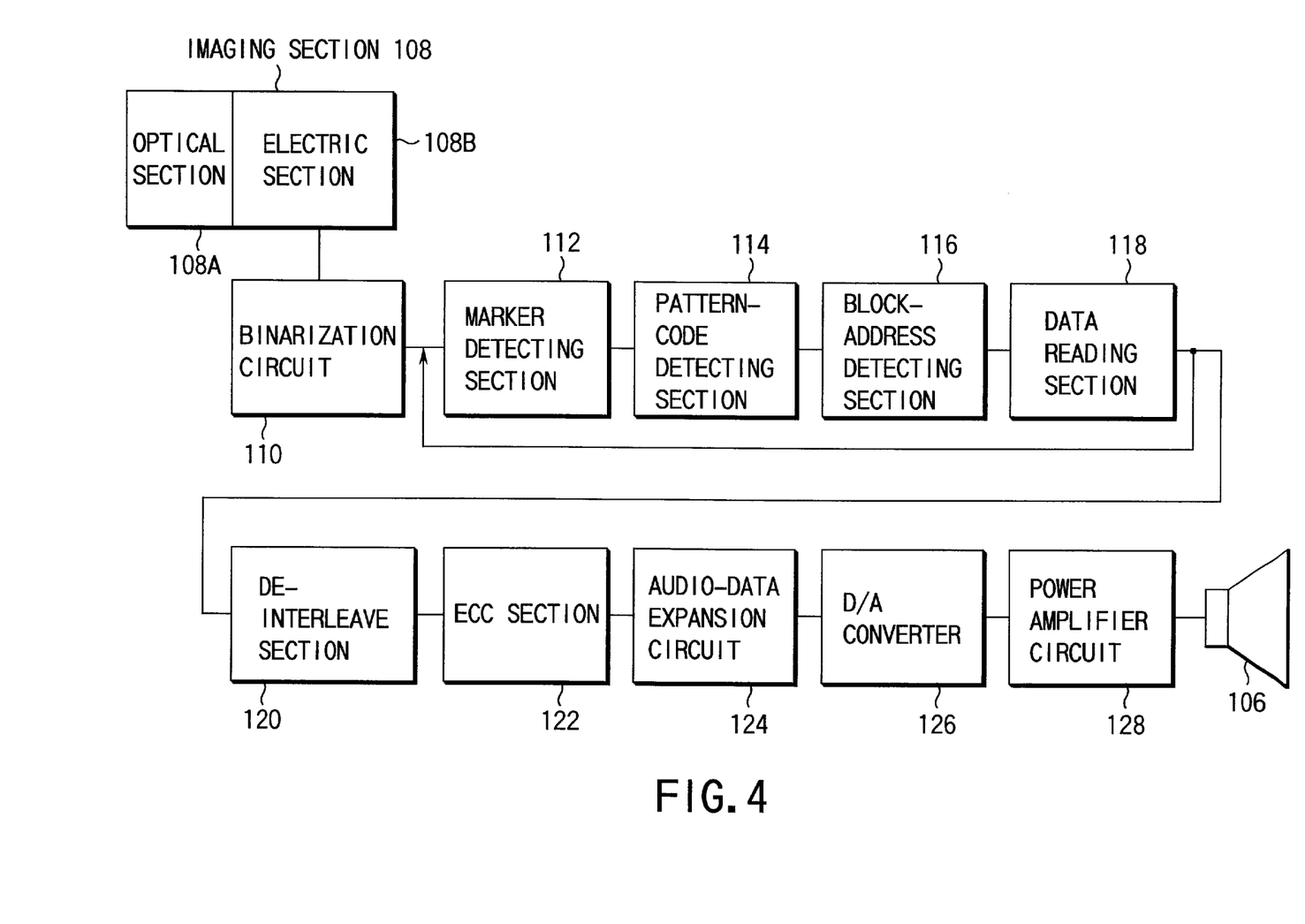
FIG. 4 is a block diagram of the dot code reader shown in FIG. 2.

As shown in FIG. 4, the dot code reader 100 comprises an imaging section 108, a binarization circuit 110, a marker detecting section 112, a patern-code detecting section 114, a block-address detecting section 116, a data reading section 118, a de-interleave section 120, an ECC section 122, an audio-data expansion circuit 124, a D/A converter 126, and a power amplifier circuit 128.

The imaging section 108 is comprises an optical section 108A and an electrical section 108B. The optical section 108A has a lens or the like. The electrical section 108B includes an imaging element such as a CCD or a CMD for converting an optical input to an image signal. The binarization circuit 110 receives an image signal from the imaging section 108 and converts the image signal to binary image data. The marker detecting section 112 extracts the markers 4 of each block 2 from the binary image data, thereby detecting the positions of the marks 4. The section 112 may extract the markers 4 and detect the positions thereof, by performing the erosion process described in, for example, the specification of U.S. Pat. No. 5,866,895.

The pattern-code detecting section 114 detects the matching-dot pattern 5 of each block 2, with reference to the markers 4 the marker detecting section 112 has detected, and further detects the true centers of the markers 4. The true centers of the markers 4 will be used as reference points when the reader 100 reads data dots 7. The block-address detecting section 116 detects the block address from the block-address pattern 6 provided between two adjacent markers 4. The data reading section 118 reads the data dots 7 printed in the data-dot pattern section 3 and performs, for example, 10-8 demodulation on the data represented by the data dots which has been subjected to 8-10 modulation at the time of recording the dot code.

The de-interleave section 120 performs de-interleave process on the data thus demodulated by the data reading section 118. The ECC section 122 corrects errors in the de-interleaved data, in units of bytes. The audio-data expansion circuit 124 expands the data that has been compressed and recorded, for example ADPCM data, after the data has been subjected to the error correction in the ECC section 122. The D/A converter 126 converts the data, thus expanded, to an analog signal. The power amplifier circuit 128 amplifies the analog signal. The analog signal amplified is supplied to the earphone 106. The earphone 106 generates the audio message represented by the analog signal.

Figure 5:
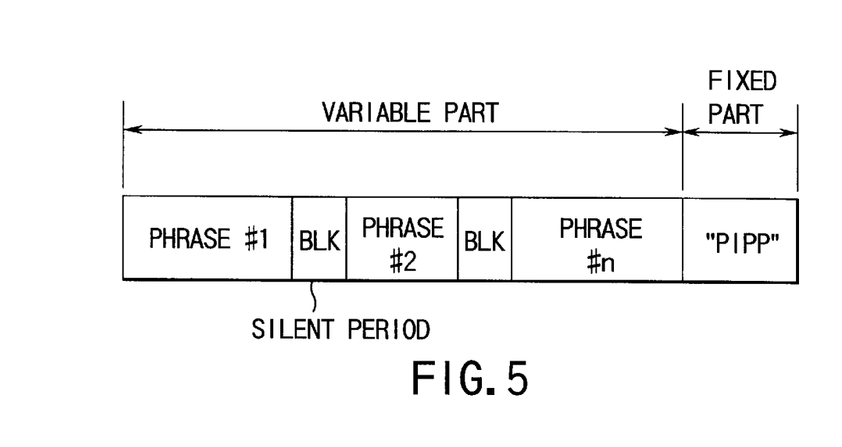
FIG. 5 is a schematic representation of an audio message reproduced by the dot code reader shown in FIG. 4.

FIG. 5 is a schematic representation of the audio message reproduced from the dot code. As FIG. 5 shows, the audio message consists of a variable part (first data item) and a fixed part (second data item). The variable part depends on the contents of the dot code. The variable part contains one or more phrases. In the case where the variable parts contains at least two phrases, a silent period BLK may be interposed between the phrases. The fixed part follows the variable part. The fixed part is common to all dot codes. In other words, any audio message contains the same fixed part, whichever dot code it has been reproduced. Alternatively, the fixed part may be common to only some of the dot codes. In this embodiment, the fixed part is a short electronic "pipp."

Figure 6:
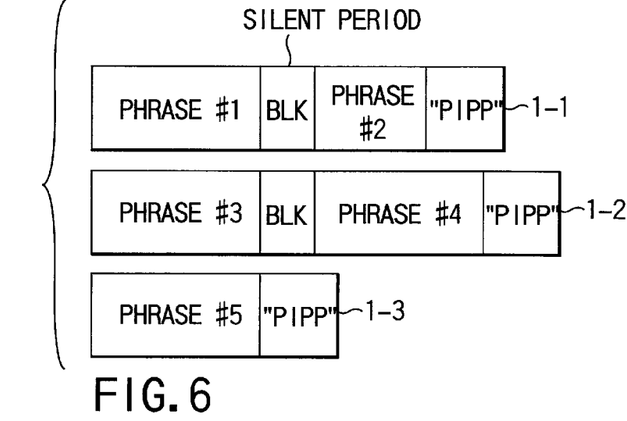
FIG. 6 is diagram showing the audio messages reproduced from the three dot codes shown in FIG. 2.

Assume that the audio messages reproduced from the three dot codes 1-1, 1-2 and 1-3 shown in FIG. 2 have the forms illustrated in FIG. 6. More precisely, the first dot code 1-1 consists of two phrases #1 and #2, one silent period BLK interposed between the phrases #1 and #2, and one electronic "pipp." Similarly, the second dot code 1-2 consists of two phrases #3 and #4, one silent period BLK interposed between the phrases #3 and #4, and one electronic "pipp." The third dot code 1-3 consists of one phrase #5 and one electronic "pipp."

It will now be described how the dot code reader 100 reads the dot codes printed on the template-type code sheet 10 and reproduces the audio messages represented by the dot codes.

First, the user holds the dot code reader 100 in the hand and moves the reader 100 over the first dot code 1-1. The reader 100 first reproduces the phase #1, which is output from the earphone 106. Upon lapse of the silent period BLK, the reader 100 reproduces the phrase #2, which is output from the earphone 106. As soon as the earphone 106 generates the phrase #2, it generates the electronic "pipp." Hearing this "pipp," the user can understand that the audio message has been completely reproduced from the first dot code 1-1. Then, user may move the dot code reader 100 to the second dot code 1-2 to scan the second dot code 1-2. Unless the user hears the "pipp," he or she determines that the audio message has not been reproduced in its entirety. Therefore, the user would not move the reader 100 to the second dot code 1-2 during the silent period BLK as he or she may do when operating the conventional dot code reader.

As the user moves the dot code reader 100 over the second dot code 1-2, the phrase #3, silence period BLK, phrase #4 and "pipp" are sequentially reproduced. Hearing the electronic "pipp" after the phrase #4, the user knows that the audio message has been completely reproduced. The user then moves the reader 100 to the third dot code 1-3, scanning the third dot code 1-3. The reader 100 reproduces first the phrase #5 and then the electronic "pipp."

Figure 3:
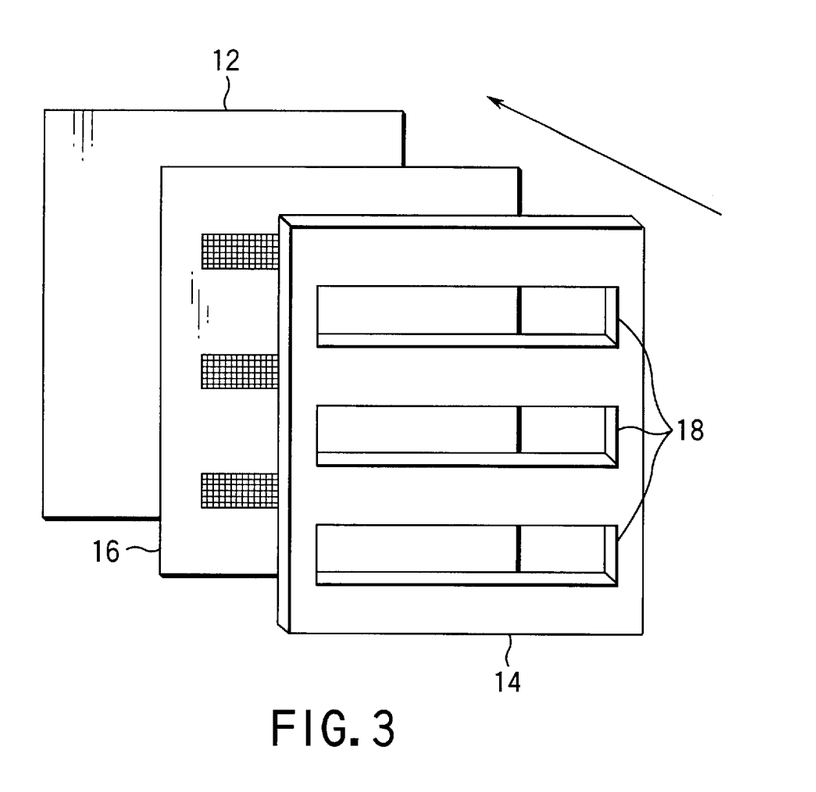
FIG. 3 is a diagram explaining how to form the template-type code sheet shown in FIG. 2.

According to the present invention, a plurality of template-type code sheets of the type shown in FIG. 2 and 3 may be bound together, forming a template-type code book.

It will be explained below how the variable part and fixed part of each audio message are reproduced from a dot code.

The variable part is reproduced from audio data that is compressed and included in the dot code, just like audio data recorded in the conventional method. By contrast, the fixed part is reproduced from audio data that can be recorded in some different methods.

The simplest method is to compress the data of the fixed part and recorded, in the same way as the data of the variable part. In this case, it suffices to add the data of the fixed part to the data of the variable part in an encoding system which is designed to generate dot codes from audio signals. The audio data representing the fixed part can be recorded in two alternative methods. The first method is to record the audio data, spaced apart from the audio data representing the variable part and assigned with a header. The second method is to combine the audio data is combined with the audio data of the variable part, thus providing a single audio signal to be recorded. If the first method is used, the audio data of the variable part and the audio data of the fixed part are independently processed in the dot code reader 100. If the second method is used, these items of audio data are processed together in the dot code reader 100.

A first alternative method of recording the audio data of the fixed part is to store the data in a memory provided in the dot code reader 100. In this case, the dot code contains only the audio data which represents the variable part, not containing the audio data of the fixed part. In the dot code reader 100, the fixed part of the audio message is reproduced from the audio data stored in the memory, after the variable part of the audio message has been reproduced from the dot code.

Figure 7:
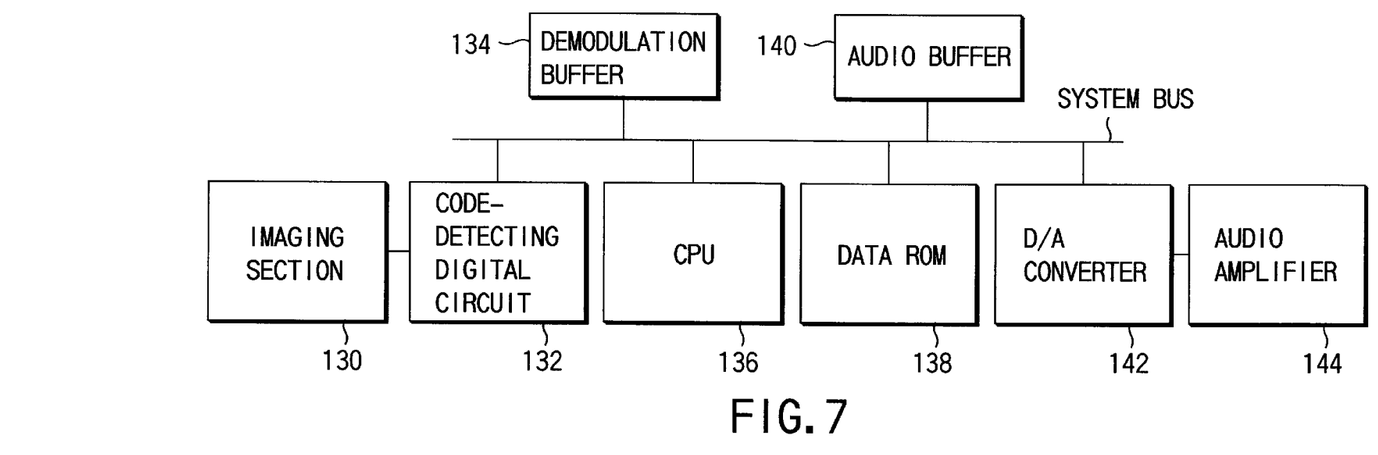
FIG. 7 is a block diagram of a modification of the first embodiment.

FIG. 7 illustrates a dot code reader designed to reproduce audio messages, each consisting of a variable part and a fixed part which are represented by, respectively, audio data contained in a dot code and audio data stored in a memory.

As FIG. 7 shows, this dot code reader comprises an imaging section 130, a code-detecting digital circuit 132, a demodulation buffer 134, a CPU 136, a data ROM 138, an audio buffer 140, a D/A converter 142, and an audio amplifier 144. The dot code reader has a system bus, to which the components 130, 132, 134, 136, 138, 140, 142 and 144 are connected.

The imaging section 130 comprises an imaging optical system, an imaging element such as a CCD, peripheral ICs such as a timing signal generator, an A/D converter for converting an audio signal to digital data, and, if necessary, an illumination device. The code-detecting circuit 132 performs the functions of the components 110, 112, 114, 116 and 118 of the reader 100 shown in FIG. 4.

The demodulation buffer 134 stores interleaved data obtained from a dot code the code-detecting circuit 132 has detected. The data stored in the buffer 134 is processed to analyze the header part of the audio message to be reproduced from the dot code and analyze also the control code contained in the fixed part of the audio message. (The control code will be described later.)

The CPU 136 performs the functions of the components 120, 122 and 124 of the dot code reader 100 shown in FIG. 4. The data ROM 138 does not store the audio data (first data item) representing the variable part of the audio message and does store the audio data (second data item) representing the fixed part of the audio message. The data ROM 138 also stores an ECC conversion table, reference data for use in expanding the audio data, and the like.

The audio buffer 140 temporarily stores any demodulated audio data. The D/A converter 142 is equivalent to the D/A converter 126 incorporated in the dot code reader 100 illustrated in FIG. 4. The CPU 136 transfers the audio data to the D/A converter 142 from the audio buffer 140. The audio amplifier 144 performs the function of the power amplifier circuit 128 used in the dot code reader 100 of FIG. 4, amplifying the analog audio signal supplied from the D/A converter 142. The analog audio signal amplified by the audio amplifier 144 is supplied to an earphone (not shown), which generates the audio message from the analog audio signal.

The variable part of the audio message is reproduced in similar to the dot code reader 100 of FIG. 4. As indicated above, the CPU 136 transfers the audio data to the D/A converter 142 from the audio buffer 140. To be more specific, the number of audio data items to be output is set in a counter, and the count of the counter is decreased by one every time one data item is transferred to the D/A converter 142. When the count of the counter reduces to zero, the transmission of the data items is finished. At the time, it may be determined that the D/A converter 142 has finished converting the audio data of the variable part to an analog audio signal. In practice, however, the D/A converter 142 may not have finished converting the audio data when the count of the counter decreases to zero. This is because the converter 142 requires tens of nanoseconds to several microseconds, depending on its characteristic, to convert one audio data item. The time the converter 142 requires is set in a timer, and the timer is started the moment the count of the counter reduces to zero. When the time set in the timer expires, it is determined that the D/A converter 142 has just finished converting the audio data to an analog audio signal. Alternatively, an interrupt may be made to the CPU 136 when the buffer provided in the converter 142 becomes empty. In this case, it is detected that the D/A converter 142 has finished converting the audio data, when an interrupt is made to the CPU 142 for the first time after the count of the counter decreases to zero.

After it has been detected that the D/A converter 142 has finished converting the audio data to an analog audio signal, the audio data of the fixed part will be output. The data ROM 138 stores the audio data of the fixed part. This data may be compressed audio data, audio waveform data not compressed, or the function of sine waves or the like, or any other kind of audio data that the CPU 136 can process. To enhance the use efficiency of the data ROM 138, the data should better be compressed audio data. If the audio data stored in the data ROM 138 is compressed one, the CPU 136 needs perform only the function of the audio-data expansion circuit 124 (FIG. 4). If the audio data is one not compressed, it sufficient for the CPU 136 to pass on the data to the D/A converter 142. If the audio data is the function of sine waves, the audio data generated from the function is first stored into the audio buffer 140 and then output to the D/A converter 142.

A second alternative method of recording the audio data of the fixed part is to store audio data items representing various kinds of fixed parts in a memory provided in a dot code reader and to record a control code designating one of these audio data items in the dot code.

Figure 8:
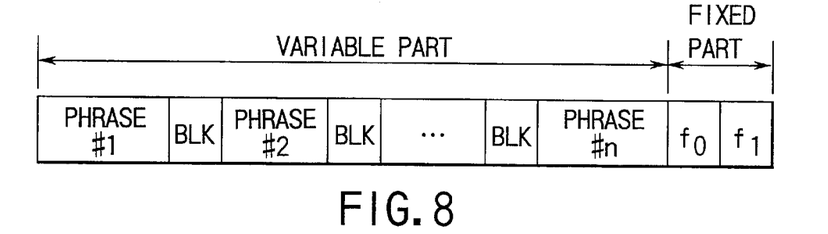
FIG. 8 is a schematic representation of an audio message reproduced by a still another modification of the first embodiment.

FIG. 8 shows the audio message reproduced from a dot code that contains a control code (third data item). As shown in FIG. 8, the control code consists of two bits ($f_0$ and $f_1$). Hence, the control code can designate four kinds of audio patterns for the fixed part. The four audio data items representing the four audio patterns are stored in the memory incorporated in the dot code reader. The data items are uncompressed waveform data items, compressed audio data items, or the like.

Figure 9:
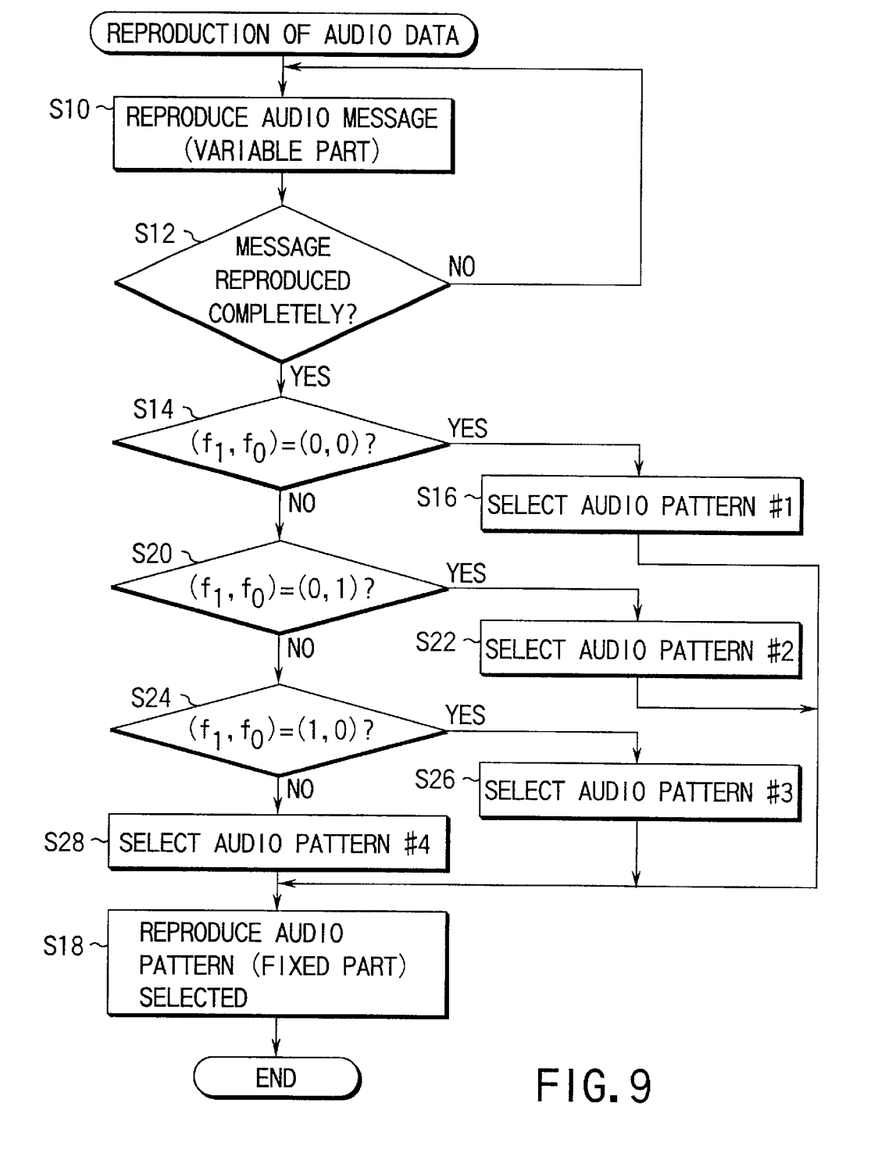
FIG. 9 is a flow chart explaining the operation of the still another modification of the first embodiment.

How the four kinds of fixed parts are reproduced will be described, with reference to the flow chart of FIG. 9.

As the dot code reader is moved over the dot code of FIG. 8, it first reproduces the variable part of the audio message, i.e., phrases and silent periods BLK (Step S10). It is determined whether or not the variable part has been reproduced completely (Step S12). If YES, it is determined whether the control code ($f_0$, $f_1$) is (0, 0) (Step S14). If YES in Step S14, the audio pattern #1 is selected (Step S16). The fixed part represented by the audio pattern #1, thus selected, is reproduced (Step S18). If NO in Step S14, the operation goes to Step S20, in which it is determined whether or not the control code ($f_0$, $f_1$) is (0, 1). If YES in Step S20, the audio pattern #2 is selected (Step S22). The fixed part represented by the audio pattern #2 is reproduced (Step S18). If NO in Step S20, the operation goes to Step S24, in which it is determined whether or not the control code ($f_0$, $f_1$) is (1, 0). If YES in Step S24, the audio pattern #3 is selected (Step S26). The fixed part represented by the audio pattern #3 is reproduced (Step S18). If NO in Step S24, i.e., when the control code ($f_0$, $f_1$) is (1, 1), the operation goes to Step S28, in which the audio pattern #4 is selected (Step S28). The fixed part represented by the audio pattern #4 is reproduced (Step S18).

To reproduce the four kinds of fixed parts as explained above, the dot code reader may have the same structure that is illustrated in FIG. 7. The data ROM 138 stores four kinds of audio patterns. The CPU 136 calculates the memory address of a desired audio pattern from the control code ($f_0$, $f_1$) and reads the desired audio pattern from the data ROM 138. The CPU 136 expands the audio pattern and outputs to the D/A converter 142, if the audio pattern is compressed data. If the audio pattern is data not compressed, the CPU 136 supplies the audio pattern to the D/A converter 142, without processing the audio pattern.

If the second alternative method of recording the audio data of the fixed part is used, it suffices to include a two-bit control code ($f_0$, $f_1$). The dot code need not include the audio data representing the fixed part of the audio message. Thus, it is sufficient for the dot code to have a small data capacity. In addition, the control code can define a plurality of audio patterns for the fixed part, though it is small data.

The dot code shown in FIG. 8 may be modified in various ways.

Figure 10:
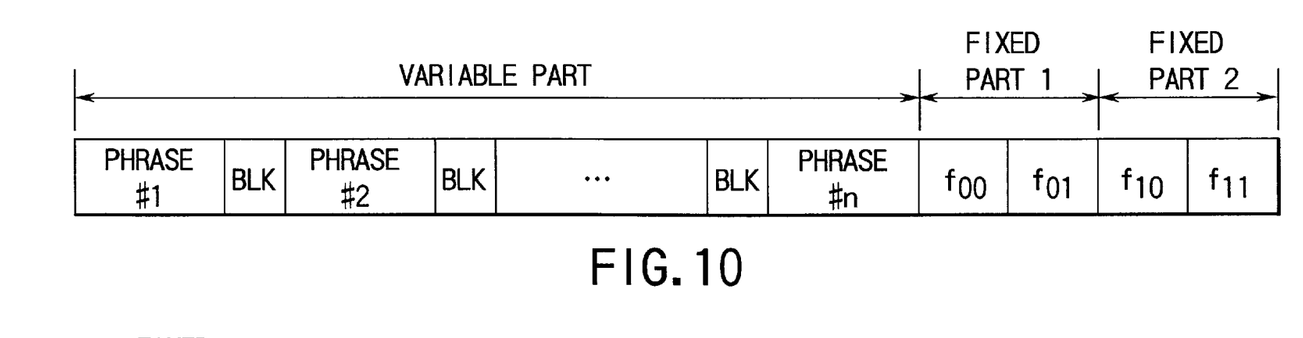
FIG. 10 is a diagram depicting the audio message reproduced from a modified dot code used in the first embodiment.

For example, the audio messages reproduced from the three dot codes 1-1, 1-2 and 1-3 (FIG. 2) may have two fixed parts 1 and 2 each as is illustrated in FIG. 10. One of the two fixed parts is a silent period BLK in the first dot code 1-1 and second dot code 1-2. Both fixed parts are electronic "pipps" in the audio message reproduced from the third dot code 1-3. In this case, upon hearing two "pipps," the user can understand that audio messages have been reproduced from all dot codes printed on a template-type code sheet. Two or more template-type code sheets may be bound together, forming a book having groups of dot codes. In this case, too, the user can understand that audio messages have been reproduced from all dot codes of any group have been, upon hearing two "pipps."

Alternatively, all dot codes may be modified so that the audio messages reproduced from them have one fixed part each. The fixed parts of all audio messages, except the last reproduced one, have the same audio pattern. The fixed part of the audio message last reproduced has a different audio pattern. In this case, the user can understand the audio message has been completely produced from each dot code, and also that all audio messages have been reproduced from all dot codes.

Still alternatively, each electronic "pipp" may be replaced by a recorded audio instruction of "Scan the next dot code."

Second Embodiment

The second embodiment of the present invention is useful as a system that helps people learn foreign languages.

In the second embodiment, dot codes and text data items corresponding to the dot codes are printed on a schoolbook. The schoolbook therefore presents both audio data and visual data, thereby to help the user learn foreign languages efficiently. Each dot code represents an audio message which may consist of a variable part and a fixed part.

Figure 11:
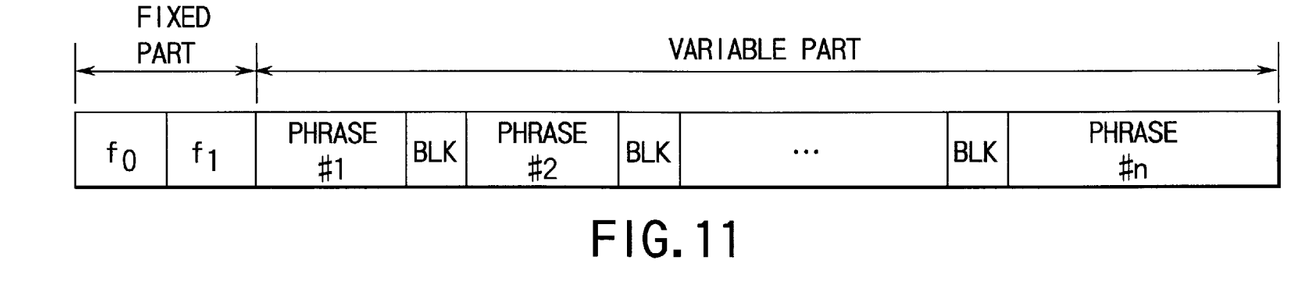
FIG. 11 is a schematic representation of an audio message reproduced by a code image reader which is the second embodiment of this invention.

The dot codes printed on the code sheet may represents spoken English words or expressions, and the text data items printed on the sheet may be the written English words or expressions. In this case, the audio messages reproduced from some of the dot codes have a fixed part which includes audio labels of "useful word" or "useful expression," while those reproduced from the remaining dot codes have a fixed part which includes no audio labels at all. Hence, the audio messages are generally similar to the one illustrated in FIG. 8, and the dot code reader operates in substantially the same way as shown in FIG. 9. However, any audio message that has a fixed part differs from the audio message of FIG. 8 in terms of the order the variable part and the fixed part are recorded. More precisely, the fixed part precedes the variable part as is illustrated in FIG. 11. Hence, the dot code reader first reproduces the fixed part (i.e., audio label of "useful word" or "useful expression" ) and then reproduces the variable part (i.e., spoken English word or expression). The fixed part shown in FIG. 11 may be a two-bit control code ($f_0$, $f_1$) as in the dot code shown in FIG. 8. That is, no audio label is reproduced is reproduced if ($f_0$, $f_1$)=(0, 0), "useful word" is reproduced if ($f_0$, $f_1$)=(0,1), and "useful expression" is reproduced if ($f_0$, $f_1$)=(1,0).

Figure 12:
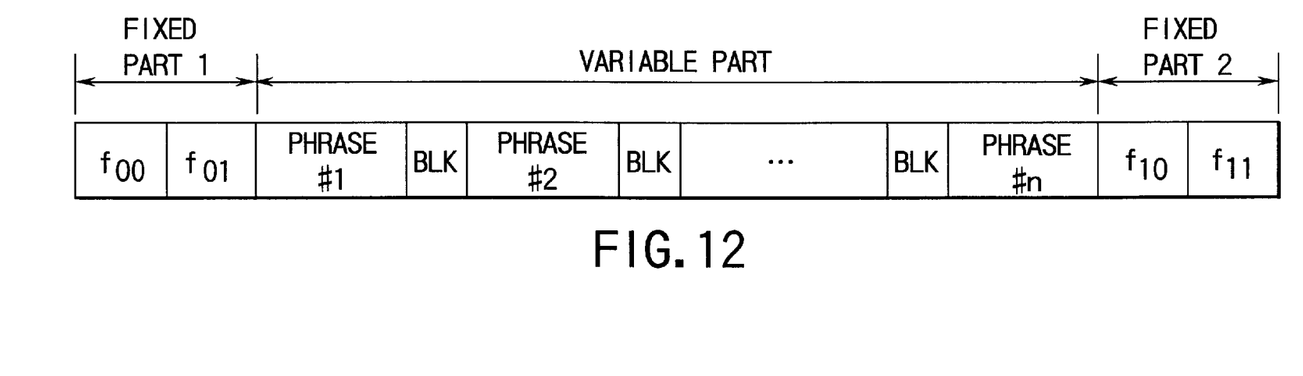
FIG. 12 is a diagram showing the audio message reproduced from another type of a dot code used in the second embodiment.

In the second embodiment, each dot code may be modified so that the fixed part is reproduced after the variable part, not before the variable part as shown in FIG. 11. Alternatively, the dot code may be modified so that the fixed part is reproduced between two consecutive phrases, replacing the silent period BLK in, for example, the audio message reproduced from the dot code 1-1 or 1-2 shown in FIG. 6. Still alternatively, the dot code may be modified so that two fixed parts are reproduced before the first phrase and after the last phrase, respectively, as is illustrated in FIG. 12.

Third Embodiment

In the first and second embodiments described above, a plurality of dot codes are read sequentially. In the third embodiment, each dot code consists of a plurality of subset codes, each being a distinct data item representing a sound, a picture, a spoken word, or the like, as discussed in U.S. Ser. No. 08/586,792. The subset codes constituting a dot code may represent, for example, audio segments which can be distinguished from one another. If this is the case, the dot code can be read in units of subsets, and the audio segments can be reproduced, on by one, from the respective subsets. When the subsets are sequentially read, the audio segments will be reproduced from the subsets, sounding like a continuous audio message.

Figure 13:
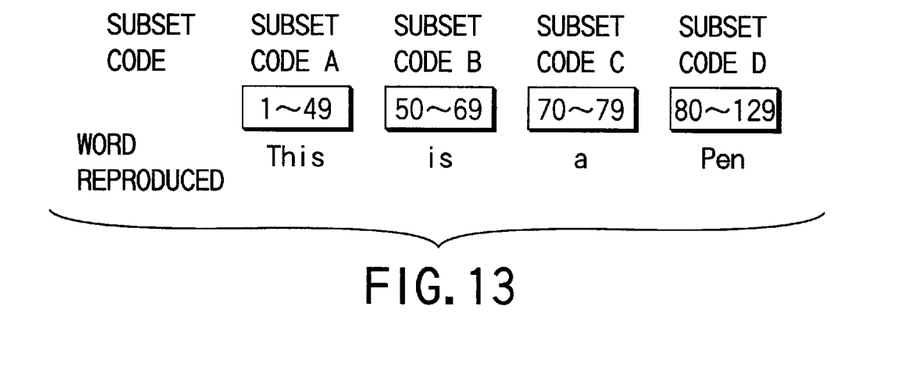
FIG. 13 is a diagram showing the subset codes constituting a dot code to be read by a dot code reader which is the third embodiment of the invention, and also showing the audio message reproduced from the subset codes read by the dot code reader.

FIG. 13 shows a dot code consisting of subset codes A to D. The subset code A has block addresses 1 to 49, the subset code B has block addresses 50 to 69, the subset code C has block addresses 70 to 79, and the subset code D has block addresses 80 to 129. The subset codes A to D have been interleaved and subjected to error-correction. Audio segments can therefore be reproduced from the subset codes A to D. When the subset codes A to D are sequentially scanned, all blocks of each subset code are reproduced since each block has one address.

When the subset code A is scanned, audio segment "this" is reproduced. When the subset code B is scanned, audio segment "is" is reproduced. When the subset codes A to D are scanned in this order, the user hears the audio message of "This is a pen."

As mentioned above, the conventional code image reader is disadvantageous in that, upon detecting any silent period, the user may misunderstand that an message has been completely reproduced from a dot code and may move the reader over the next dot code, leaving the remaining part of the message not reproduced. To prevent this from happening, an end code is added to each of the subset codes A to D. When one of the subset codes A to D is scanned, a sound is reproduced from the end code, indicating that audio segment has just been reproduced. Moreover, all of the subset codes A to D are scanned, a sound is reproduced from the end code, indicating that the audio message has been reproduced completely.

Figure 14:
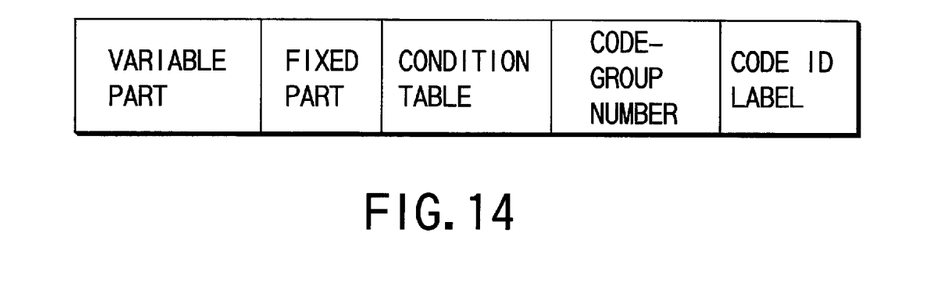
FIG. 14 is a schematic representation of one of the subset codes shown in FIG. 13.

More specifically, a fixed part and a table of sound-reproducing conditions are added to each subset code. Thus, as shown in FIG. 14, each subset code consists of a variable part, a fixed part, a condition table, a code-group number, and a code ID label. The variable part and the fixed part are identical to those used in the first and second embodiments, and will not be described.

The condition table represents the conditions in which to reproduce the sound of the fixed part. To be specific, the condition table describes the information of A, B, C, D, A+B+C+D (where A, B, C and D are subset codes).

Figure 15:
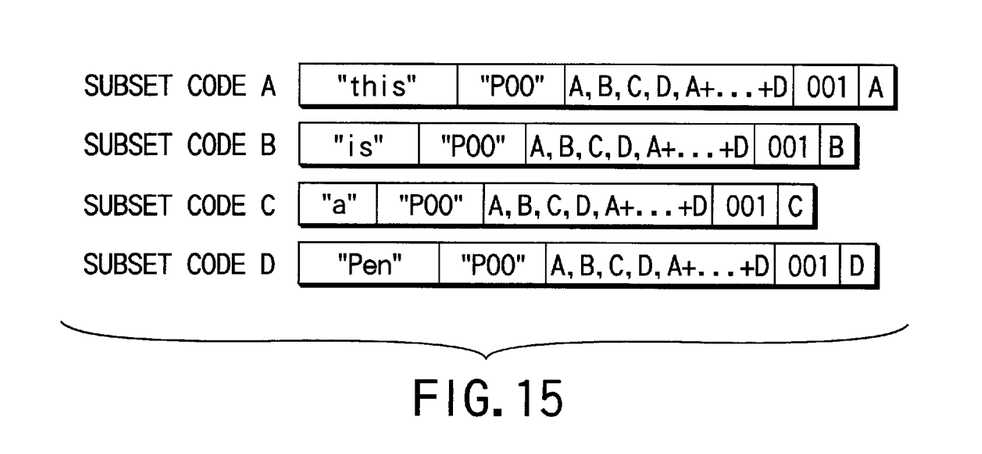
FIG. 15 is a diagram illustrating the subset codes of FIG. 13, in detail.

The code-group number is the common ID number assigned not only to the subset code but also to the other subset codes of the same dot code. The subset codes constituting a dot code, which are assigned with the same code-group number, have different block addresses and can therefore be read and reproduced, either one by one or at together at the same time. The code ID label is the ID label assigned to the subset code. That is, the subset codes constituting a dot code have different code ID labels. FIG. 15 illustrates the subset codes A to D in greater detail.

It will be explained below how the dot code reader operates when it scans and reads the dot code shown in FIG. 15.

First it will be described how the dot code reader operates when it reads the subset code A only. The dot code reader demodulates the subset code A, acquiring two audio data items representing the spoken word "this" and the audio end mark "poo," respectively, the condition table, and two other data items that represent the code-group number "001" and the code ID label "A," respectively. From the block address of the subset code A it has read, the dot code reader determines that the subset code A has just been read and that no other subset codes have been read. Since "A" is described in the condition table, the dot code reader determines that both the variable part and the fixed part should be reproduced. The dot code reader therefore expands the audio data items representing the variable part and the fixed part and converts them into analog audio signals.

It will now be described how the dot code reader operates when it reads all subset codes A to D.

The dot code reader demodulates the subset codes A to D. Thus, it acquires four audio data items representing the spoken words "this," "is," "a" and "pen"; an audio data item representing the audio end mark "poo"; the condition table; the code-group number, i.e., "001"; and the four code ID labels "A," "B," "C," and "D." From the block addresses of the subset codes A to D it has read, the dot code reader determines that the subset codes A to D have been read and no other subset codes have been read. Since "A+B+C+D" is described in the condition tables, the dot code reader determines that both the variable part and the fixed part of each subset code should be reproduced. The dot code reader therefore expands the audio data items representing the variable part of each subset code and converts them into analog audio signals, and then expands the audio data item representing the fixed part and converts it into analog audio signals.

When the dot code reader reads subset codes in a combination that is not described in the condition table, the fixed part is not reproduced. Alternatively, it may not reproduces the variable parts of the read subset codes.

As described above, each of the subset codes A to D have a fixed part as an audio data item. Instead, each subset code may have a fixed part as a control code. If this is the case, the dot code reader stores an audio data item corresponding to the control code.

The present invention is not limited to the embodiments described above. Various changes and modifications can be made within the scope and spirit of the invention. For instance, dot code readers according to the invention may store different audio data items for the fixed part of an audio message. These audio data items may represent, for example, the voices characteristics of various animation characters, respectively.

The present invention can provide the following code image reading apparatuses:

(1) A code image reading apparatus comprising:
   an imaging section for optically reading code images printed on a recording medium and converting the code images to image signals when the code image reading apparatus is manually operated, each of said code images being a coded data item containing a first data item which includes at least one of audio data, video data and text data;
   a data-restoring section for processing each of the image signals output from the imaging section, thereby restoring the coded data item containing the first data item;
   a first data output section for processing the coded data restored by the data-restoring section, thereby outputting the first data item; and
   a second data output section for processing prescribed ones of the code images, thereby outputting a second data item which is different from the first data item and which is common to the prescribed coded images,
   wherein the first and second output sections operate in association to output the first data item and the second data item, respectively.

Since the first and second output sections operate in association to output main data (first data item) and other data (second data item), respectively, the code image reading apparatus can reproduce data, which consists of main data and sub-data modifying the main data and which is therefore easy for the user to recognize.

In other words, the present invention can provide a system comprising a code image representing an audio message and an apparatus for reading the code image. The audio message consists of a variable part which is specific to the audio message and a fixed part which is common to a group of code images. This system is advantageous in the following respects:

1. The fixed part may be an audio end mark that informs the user that the coded data in the code image has been reproduced. Until the user hears the end mark, he or she would not move the reading apparatus to the next code image. And upon hearing the end mark, the user can move the apparatus at once to the next code image, wasting no time; and
2. The last of code images forming a group my represent an audio message the fixed part of which is an audio instruction, telling the user what he or she should do next. The audio instruction helps the user operate the apparatus smoothly.

(2) The code image reading apparatus described in the paragraph (1), wherein
   the second data output section include an output detecting section for detecting that the first data output section has output the first data item, and
   when the output detecting section detects that the first data output section has output the first data item, the second data output section outputs the second data item after outputting of the first data item.

Since it is detected that the first data item has been output, an audio mark can be reproduced from the second data item associated with the first data item after an audio message is reproduced from the first data item. The audio mark, thus reproduced, may inform the user of the completion of reproducing the audio message from one code image or audio messages from a group of code images.

(3) The code image reading apparatus described in the paragraph (2), wherein
   the first data output section include a data converting section for performing digital-to-analog conversion on the coded data restored by the datarestoring section and containing the first data item, and
   the output detecting section is designed to detect that the first data item has been output, when the data converting section finishes processing the first data item.

If so, the completion of the reproduction of the first data item can be reliably detected, because it is detected by detecting the completion of the digital-to-analog conversion.

(4) The code image reading apparatus described in the paragraph (1), wherein
   the first data output section includes an output detecting section for detecting that the second data output section has output the second data item, and
   when the output detecting section detects that the second data output section has output the second data item, the first data output section outputs the first data item after outputting the second data item.

Since it is detected that the second data item has been output, an audio label can be reproduced from the second data item associated with the first data item, before an audio message is reproduced from the first data item. The audio label, thus reproduced, may inform the user of the usefulness the audio message before the audio message is reproduced.

(5) The code image reading apparatus described in the paragraph (4), wherein
   the second data output section include a data converting section for performing digital-to-analog conversion on the coded data containing the second data item, and
   the output detecting section is designed to detect that the second data item has been output, when the data converting section finishes processing the first data item.

In this case, the completion of the reproduction of the second data item can be reliably detected, because it is detected by detecting the completion of the digital-to-analog conversion.

(6) The code image reading apparatus described in the paragraph (1), wherein the second data item is contained in the code image, along with the first data item.

Therefore, the apparatus can acquire both data item when it reads the code image. The apparatus need not have a memory for storing the second data item and can be manufactured at the same cost as the conventional code image reader.

(7) The code image reading apparatus described in the paragraph (1), further comprising a storage section for storing the second data item.

Hence, the code image does not contain the second data item. The image code is therefore shorter than otherwise. In addition, the second data item stored in the storage section may be one representing any audio mark the user desires. Thus, the apparatus can generate an audio mark specific to it.

(8) The code image reading apparatus described in the paragraph (1), further comprising a storage section for storing the second data item, and
   wherein the code image contains the first data item and a third data item, which is distinct from the first data item and which designates the second data item stored in the storage section.

The third data item is small, and the code image is relatively short. Data items similar to the second data item may be stored in the storage section. In this case, the third data item may designate two or more of the data items stored in the storage section. This renders the apparatus more useful.

(9) The code image reading apparatus described in the paragraph (1), wherein the recording medium is designed to help users learn languages.

As the apparatus is moved over the recording medium, it reads the code image and generates spoken words, phrases, expressions and sentences, and also generates audio labels informing the user that this or that word, phase, expression or sentence is useful.

(10) The code image reading apparatus described in any one of the paragraphs (1) to (9), wherein the first and second data items are audio data items.

More precisely, the first and second data items represent an audio message and an audio mark, respectively. Generally it takes the user much more time to determine that the audio message has been reproduced in its entirety, than to know that an image has been completely reproduced from a video signal. Nonetheless, upon hearing the audio mark reproduced as soon as the audio message is reproduced, the user can immediately understand that the audio message has been completely reproduced. He or she need not waste time to determine whether or not the audio message has been reproduced in its entirety.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code image reading apparatus comprising:
an imaging section for optically reading from a recording medium having at least one of a plurality of code images which each comprise coded data representing at least first data including at least one of first audio data, video data and text data;
a data restoring section that processes an output signal from the imaging section to thereby restore the coded data; and
a data output section that: (i) processes the coded data restored by the data restoring section and outputs the first data, and (ii) outputs second data, together with the first data, when the code image read by the imaging section also contains second data which differs from the first data, said second data being fixed data contained in each of said plurality of code images and comprising at least one of second audio data, video data and text data.

2. The apparatus according to claim 1, wherein, the first data and the second data are both audio data items.

3. The apparatus according to claim 1, wherein the data output section includes an output detecting section that detects that the first data has been output, and outputs the second data after the first data when the output detecting section detects that the first data has been output.

4. The apparatus according to claim 3, wherein the first data and the second data are both audio data items, and the second data comprises a data item that informs a user that the first data has been output.

5. The apparatus according to claim 3, wherein the data output section comprises a data converting unit that performs digital-to-analog conversion of the first data, and the output detecting section detects that the first data has been output when the data converting unit finishes processing the first data.

6. The apparatus according to claim 1, wherein the data output section includes an output detecting section that detects that the second data has been output, and outputs the first data after the second data when the output detecting section detects that the second data has been output.

7. The apparatus according to claim 6, wherein the first data and the second data are both audio data items, and the second data comprises a data item that gives a user guidance with respect to the first data.

8. The apparatus according to claim 6, wherein the data output section comprises a data converting unit that performs digital-to-analog conversion of the second data, and the output detecting section detects that the second data has been output when the data converting unit finishes processing the second data.

9. The apparatus according to claim 1, wherein the first data and the second data are separated from each other by a header.

10. A code image reading apparatus comprising:
an imaging section for optically reading from a recording medium having at least one of a plurality of code images which each comprise coded data representing at least first data including at least one of first audio data, video data and text data;
a data restoring section that processes an output signal from the imaging section to thereby restore the coded data;
a storage section that stores second data that differs from the first data; and
a data output section that; (i) processes the coded data restored by the data restoring section and outputs the first data, and (ii) outputs the second data, together with the first data, when the code image read by the imaging section also contains data which designates the second data and causes the second data to be output, said second data comprising at least one of second audio data, video data and text data.

11. The apparatus according to claim 10, wherein the second data is fixed data contained in each of said plurality of code images.

12. The apparatus according to claim 10, wherein the first data and the second data are both audio data items.

13. The apparatus according to claim 10, wherein the second data stored in said storage section comprises a plurality of types of data, and the type of the second data to be output by the data output section is selected in accordance with the data contained in the code image read by the imaging section which designates the second data and causes the second data to be output.

14. The apparatus according to claim 10, wherein the data output section includes an output detecting section that detects that the first data has been output, and outputs the second data after the first data when the output detecting section detects that the first data has been output.

15. The apparatus according to claim 14, wherein the first data and the second data are both audio data items, and the second data comprises a data item that informs a user that the first data has been output.

16. The apparatus according to claim 14, wherein the data output section comprises a data converting unit that performs digital-to-analog conversion of the first data, and the output detecting section detects that the first data has been output when the data converting unit finishes processing the first data.

17. The apparatus according to claim 10, where the data output section includes an output detecting section that detects that the second data has been output, and outputs the first data after the second data when the output detecting section detects that the second data has been output.

18. The apparatus according to claim 17, wherein the first data and the second data are both audio data items, and the second data comprises a data item that gives a user guidance with respect to the first data.

19. The apparatus according to claim 17, wherein the data output section comprises a data converting unit that performs digital-to-analog conversion of the second data, and the output detecting section detects that the second data has been output when the data converting unit finishes processing the second data.

\* \* \* \* \*